(12) United States Patent
Deltel

(10) Patent No.: US 11,768,381 B2
(45) Date of Patent: Sep. 26, 2023

(54) VISION APPARATUS OFFERING NIGHT VISION AND DIRECT VISION OF A SURROUNDING SCENE

(71) Applicant: PHOTONIS FRANCE, Brive (FR)

(72) Inventor: Geoffroy Deltel, Brive (FR)

(73) Assignee: PHOTONIS FRANCE, Brive (FR)

(*) Notice: Subject to any disclaimer, the term of this patent is extended or adjusted under 35 U.S.C. 154(b) by 121 days.

(21) Appl. No.: 17/596,780

(22) PCT Filed: Jun. 18, 2020

(86) PCT No.: PCT/FR2020/051056
§ 371 (c)(1),
(2) Date: Dec. 17, 2021

(87) PCT Pub. No.: WO2020/254765
PCT Pub. Date: Dec. 24, 2020

(65) Prior Publication Data
US 2022/0317450 A1    Oct. 6, 2022

(30) Foreign Application Priority Data
Jun. 20, 2019  (FR) ................................. 1906602

(51) Int. Cl.
*G02B 27/01* (2006.01)
*G02F 1/133* (2006.01)
*G02F 1/163* (2006.01)

(52) U.S. Cl.
CPC ..... *G02B 27/0172* (2013.01); *G02F 1/13318* (2013.01); *G02F 1/163* (2013.01); *G02B 2027/0118* (2013.01)

(58) Field of Classification Search
CPC ... G02F 1/163; G02F 1/13318; G02B 23/125; G02B 27/0172; G02B 2027/0118; G02B 2027/0138; G02B 26/02; H04N 23/20
See application file for complete search history.

(56) References Cited

U.S. PATENT DOCUMENTS 6,088,165 A * 7/2000 Janeczko ........... G02B 27/0172
359/353
7,307,793 B2 * 12/2007 Ottney ................. G02B 27/017
348/217.1

(Continued)

FOREIGN PATENT DOCUMENTS

FR         2916863 A1 * 12/2008 ............. G02B 23/12
WO   WO-2007002508 A2 *  1/2007 ............. F16M 11/02

OTHER PUBLICATIONS

Search Report issued in French Patent Application No. 1906602 dated Mar. 5, 2020.

(Continued)

*Primary Examiner* — Vinh T Lam
(74) *Attorney, Agent, or Firm* — Pearne & Gordon LLP

(57) ABSTRACT

Vision apparatus intended to be mounted on the head of a user, including: a night vision device, for forming first virtual images; an offsetting element, for projecting the first virtual images in the field of view of the user; a shutter, such that the offsetting element is between the shutter and the eye of the user, and able to have an open position that allows light to pass and a closed position that blocks light; a switching element with an open position that authorises emission of the first virtual images or the transfer thereof to the offsetting element, and a closed position that blocks the image emission or transfer; and a controlling device controlling the shutter and the switching element according to opening and closing cycles so the shutter is closed during all or a portion of the time during which the switching element is open, and inversely.

13 Claims, 4 Drawing Sheets

(56) References Cited

U.S. PATENT DOCUMENTS

| | | | | |
|---|---|---|---|---|
| 7,643,210 B2* | 1/2010 | Faure | | G02B 23/12 |
| | | | | 359/407 |
| 7,864,432 B2* | 1/2011 | Ottney | | H04N 5/33 |
| | | | | 348/217.1 |
| 8,431,881 B2* | 4/2013 | Filipovich | | G02B 23/125 |
| | | | | 359/411 |
| 8,735,817 B2* | 5/2014 | Thomas | | G02B 23/125 |
| | | | | 250/330 |
| 9,243,870 B2* | 1/2016 | Teetzel | | G02B 23/125 |
| 9,470,891 B2* | 10/2016 | Andersson | | G03B 21/28 |
| 10,331,207 B1* | 6/2019 | Simmons | | H04N 13/344 |
| 10,416,436 B2* | 9/2019 | Duby | | G02B 23/18 |
| 10,582,133 B1* | 3/2020 | Thomas | | G02B 27/4205 |
| 10,684,684 B1* | 6/2020 | Simmons | | H04N 13/339 |
| 10,805,600 B2* | 10/2020 | Keesling | | H04N 13/156 |
| 2007/0235634 A1* | 10/2007 | Ottney | | G01J 5/0265 |
| | | | | 250/214 VT |
| 2008/0143639 A1* | 6/2008 | Gerbe | | G02B 27/0172 |
| | | | | 345/8 |
| 2011/0227813 A1* | 9/2011 | Haddick | | G06V 40/197 |
| | | | | 345/8 |
| 2011/0240834 A1 | 10/2011 | Baudou et al. | | |
| 2011/0254855 A1* | 10/2011 | Anders | | G02B 27/017 |
| | | | | 345/589 |
| 2012/0242724 A1 | 9/2012 | Kurozuka et al. | | |
| 2016/0217327 A1 | 7/2016 | Osterhout et al. | | |

OTHER PUBLICATIONS

International Search Report for Application No. PCT/FR2020/051056 dated Nov. 4, 2020.
Written Opinion for PCT/FR2020/051056 dated Nov. 4, 2020.

* cited by examiner

VISION APPARATUS OFFERING NIGHT VISION AND DIRECT VISION OF A SURROUNDING SCENE

This is the National Stage of PCT international application PCT/FR2020/051056, filed on Jun. 18, 2020 entitled "VISION APPARATUS PROVIDING NIGHT VISION AND DIRECT VISION OF A SURROUNDING SCENE", which claims the priority of French Patent Application No. 1906602 filed Jun. 20, 2019, both of which are incorporated herein by reference in their entirety.

TECHNICAL FIELD

The invention relates to the field of view apparatuses intended to be mounted on the head of a user, and able to offer the user both a direct view of a surrounding scene and a view of a virtual image.

PRIOR ART

Known in the prior art are vision apparatuses of the glasses, headset, or mask type, able to be mounted on the head of a user in order to offer the user both a view of a surrounding scene, seen through an at least partially transparent screen, and a view of a virtual image. Such apparatuses form augmented reality vision apparatuses. The virtual image is formed at a distance from the eye, then brought to the field of view of the user by an offsetting element, partially transparent, that extends to front of the eye.

One of the ideas at the basis of the invention consists of adapting this concept to the field of night vision, by proposing a vision apparatus intended to be mounted on the head of a user, able to offer the user both a direct vision of a surrounding scene and a view of the same scene in night vision.

Another objective of the present invention is to ensure that such a vision apparatus offers great discretion of use under low lighting conditions.

PRESENTATION OF THE INVENTION

This objective is achieved with a vision apparatus intended to be mounted on the head of a user, comprising:
- a night vision device, configured to form intensified and/or infrared images of a surrounding scene, named first virtual images;
- an offsetting element, at least partially transparent, and configured to, in use, be positioned in front of an eye of the user and project said first virtual images in the field of view of the user;
- a shutter, positioned in such a way that in use the offsetting element is between the shutter and the eye of the user, and able to have an open position wherein it has a first transmission rate and a closed position wherein it has a second transmission rate, less than the first transmission rate;
- a switching element, able to have an open position wherein it authorises the emission of the first virtual images by the night vision device or the transfer thereof from the night vision device to the offsetting element, and a closed position wherein it blocks said emission or said transfer; and
- a controlling device, configured to control the opening and the closing of the shutter as well as the opening and the closing of the switching element, in such a way that the shutter is closed during all or a portion of a period during which the switching element is open, and inversely.

In all of the text, it is understood that the term "period" refers to a duration, or interval of time.

The vision apparatus according to the invention is able to offer the user both a direct vision of a surrounding scene, seen in transparency through the offsetting element at least, and a view as night vision of the same scene, corresponding to the first virtual images formed by the night vision device and projected in the field of view of the user.

The switching element according to the invention can alternatively have an open position or a closed position.

In the open position thereof, the switching element authorises the emission of the first virtual images by the night vision device or the transfer thereof from the night vision device to the offsetting element. A light radiation coming from the night vision device can then form parasite reflections at the offsetting element and/or on the eye of the user and/or on the skin of the user in a zone of the face near the eye.

In the closed position thereof, the switching element blocks the emission of the first virtual images by the night vision device or the transfer thereof from the night vision device to the offsetting element. In this case, no light radiation coming from the night vision device is able to form parasite reflections at the offsetting element and/or on the eye of the user and/or on the skin of the user in a zone of the face near the eye.

In the same way, the shutter according to the invention can alternatively have an open position or a closed position.

In the open position thereof, the shutter allows the light to pass from the surrounding scene to the eye, thus offering the user a direct vision of the surrounding scene.

In the closed position thereof, the shutter blocks the passage of the light between the surrounding scene and the eye of the user. The user is thus prevented from directly observing the surrounding scene. In this position, the shutter also prevents a light radiation coming from the night vision device, reflecting in the offsetting element and/or on the eye of the user and/or on the skin of the user in a zone of the face close to the eye, from being seen by an observer. This blocking of the parasite reflections by the shutter is all the more so pertinent in low lighting conditions, wherein the latter could easily be detected by an observer.

The controlling device according to the invention makes it possible, during at least one portion of the time during which the switching element is in the open position, for the shutter to be in the closed position. Thus, during at least one portion of the time during which a light radiation coming from the night vision device is able to form parasite reflections at the offsetting element and/or on the eye of the user and/or on the skin of the user in a zone of the face near the eye, the shutter prevents these parasite reflections from being seen by a third observer.

Symmetrically, the controlling device according to the invention also makes it possible, during at least one portion of the time during which the switching element is in the closed position, for the shutter to be in the open position. Thus, during at least one portion of the time during which no light radiation coming from the night vision device is able to form parasite reflections at the offsetting element and/or on the eye of the user and/or on the skin of the user in a zone of the face near the eye, the shutter authorises for the user a direct vision of the surrounding scene. In yet other words, during at least one portion of the time during which no light radiation coming from the night vision device risks being seen by a third observer, the shutter authorises for the user a direct vision of the surrounding scene.

The vision apparatus thus offers both a direct view of the surrounding scene, and the view of the same scene in night vision. These two views of the surrounding scene are not offered to the user at the same time, which makes it possible to guarantee great discretion in the use of the vision apparatus, even under low lighting conditions.

According to the invention, the controlling device has an operating mode wherein it is configured to:
control first successive cycles of opening and of closing the shutter; and
control second successive cycles of opening and of closing of the switching element;
where at each first cycle and each second cycle, the shutter is closed during all or a portion of the period during which the switching element is open, and inversely.

Advantageously, the controlling device is able to control a variation of a duty cycle of the first successive cycles of opening and of closing of the shutter and/or a variation of a duty cycle of the second successive cycles of opening and of closing of the switching element. The duty cycle of a first cycle is equal to the duration during which the shutter is in the open position during this first cycle divided by the total duration of this first cycle. The duty cycle of a second cycle is equal to the duration during which the switching element is in the open position during this second cycle divided by the total duration of this second cycle.

It can be considered that the control according to successive cycles of opening and of closing defines a periodic signal, with, if so, a duty cycle varying over time. The periodic signal has preferentially a fixed frequency. As a variant, this periodic signal can have a frequency varying over time.

The controlling device can have an operating mode wherein it is configured to control the opening and the closing of the shutter as well as the opening and the closing of the switching element in such a way that the shutter is closed during the entire time when the switching element is open, and inversely.

Other advantageous characteristics of the invention are mentioned in the claims dependent of claim 1.

The invention also covers a method implemented in a vision apparatus according to the invention, which comprises the following steps:
openings and closings of the shutter, controlled by the controlling device; and
openings and closings of the switching element, controlled by the controlling device;
wherein the shutter is closed during all or a portion of a period during which the switching element is open, and inversely.

The method according to the invention comprises the following steps:
openings and closings of the shutter, controlled by the controlling device, and according to first successive cycles of opening and of closing of the shutter; and
openings and closings of the switching element, controlled by the controlling device, and according to second successive cycles of opening and of closing of the switching element;
where at each first cycle and each second cycle, the shutter is closed during all or a portion of the period during which the switching element is open, and inversely.

Other advantageous characteristics of the method according to the invention are mentioned in the claims.

BRIEF DESCRIPTION OF THE FIGURES

The present invention will be better understood when reading the description of embodiments given sole for the purposes of information and in no way limiting, in reference to the accompanying drawings wherein.

DESCRIPTION OF EMBODIMENTS

Figure 1A:
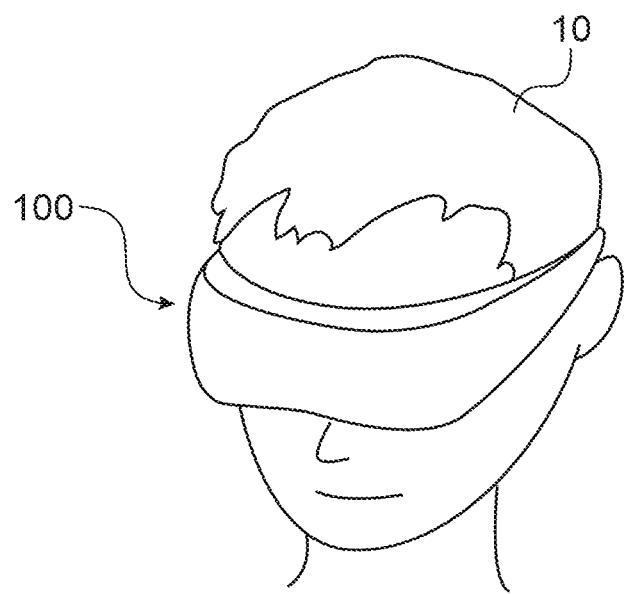
FIG. 1A diagrammatically shows a vision apparatus according to the invention, mounted on the head of a user.

FIG. 1A diagrammatically shows a vision apparatus 100 according to the invention mounted on the head of a user 10. The vision apparatus 100 forms a wearable device, able to be mounted on the head of the user 10 by covering at least one portion of the face at the height of the eyes. The vision apparatus 100 has for example the form of glasses, a mask or a headset integrating the elements of the vision apparatus 100. In use, the vision apparatus 100 is fixed relatively to the head of the user 10.

In the following figures, the eye of the user is shown, in order to facilitate the comprehension of the invention. It is of course understood that the eye is not part of the vision apparatus according to the invention.

Figure 1B:
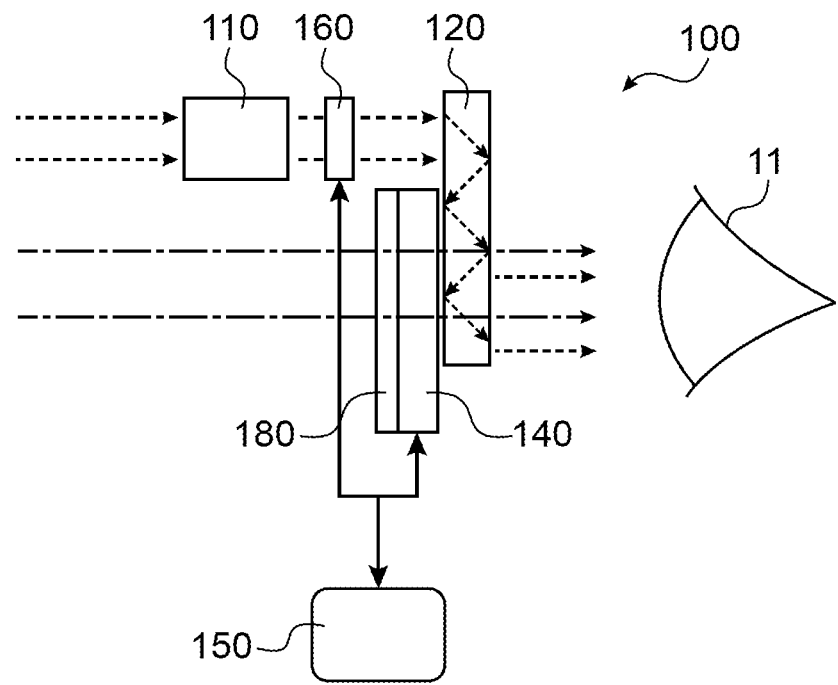
FIG. 1B diagrammatically shows a first embodiment of a vision apparatus according to the invention.

FIG. 1B diagrammatically shows the vision apparatus 100 according to a first embodiment of the invention. The vision apparatus 100 here comprises: a night vision device 110, an offsetting element 120, a shutter 140, a switching element 160, and a controlling device 150.

The night vision device 110 designates an imaging device for improving night vision, in low-light conditions. Such a device uses preferably a technology based on the intensification of light, thermal detection, low light level detection (in particular using CMOS sensors), or a combination of these technologies. It is configured to acquire an intensified and/or infrared image of a surrounding scene. An intensified image here designates an image formed by amplifying an incident luminous flux, or formed using a highly sensitive sensor.

The night vision device 110 can comprise an image intensifier tube, provided with a photocathode, a means for electron multiplication and a phosphor screen. When operating, the photocathode converts an incident photon flux into an electron flux. This electron flux is accelerated and propagates to the means for multiplication, at which the energy of each accelerated incident electron causes the emission of several secondary electrons. An intense flux of electrons is thus generated. The intense electron flux is received by a phosphor screen, and converted by the latter into an intense photon flux. This intense photon flux corresponds to the photon flux incident on the photocathode, but is more intense. The night vision device 110 thus provides an intensified image of the surrounding scene, which is projected at the output of the intensifier tube.

Alternatively, the night vision device 110 can comprise a matrix of sensors ultra-sensitive in the visible and/or sensitive in infrared, in order to acquire an image which is then displayed on a display screen. Said matrix of sensors can comprise low light level CMOS or CCD sensors, and/or electron-bombarded CMOS or CCD sensors, and/or intensified CMOS or CCD sensors, and/or photodiodes sensitive in infrared, etc. The infrared bands concerned are in particular SWIR (shortwave infrared, corresponding to wavelengths ranging from 1.4 µm to 3 µm), MWIR (midwave infrared, corresponding to wavelengths ranging from 3 µm to 8 µm) and/or LWIR (longwave infrared, corresponding to wavelengths ranging from 8 µm to 15 µm), even near infrared (corresponding to wavelengths ranging from 0.75 µm to 1.4 µm). The night vision device 110 thus provides an intensified and/or infrared image of the surrounding scene, which is displayed on the display screen.

The image provided at the output of the night vision device 110 is named "first virtual image". This image is formed by a light radiation belonging to the visible spectrum (between 400 nm and 700 nm). In other terms, the night vision device 110 captures wavelengths that can belong to infrared, but renders an image in the visible spectrum.

The offsetting element 120 extends between the output of the night vision device 110, and a region located, in use, in front of the eye 11 of the user. In use, at least one portion of the offsetting element 120 extends in front of the eye 11 of the user. The offsetting element 120 is configured to project, in the field of view of the user, the first virtual images provided as output from the night vision device 110. The offsetting element is at least partially transparent in the visible spectrum, in order to prevent disturbing the direct vision of the surrounding scene. It has a transmission rate in the visible greater than or equal to 10%, even greater than or equal to 30%.

Here, the offsetting element 120 comprises a planar waveguide, configured to receive as input the first virtual images provided by the night vision device 110, in order to guide these images to an extraction zone, located in use in front of the eye 11 of the user, and to project these images to the eye 11 of the user. Two holographic elements are advantageously formed on the planar waveguide, one for playing a role of deviation of a collimated incident radiation, at the night vision device 110, the other for scattering the light to the eye of the user, at the extraction zone.

According to an alternative not shown, the offsetting element 120 can comprise a prism, in particular a thick glass that extends at least partially in front of the eye 11, in use.

FIG. 1B shows as a dotted line the light radiation coming from the surrounding scene and propagating to the night vision device 110, as well as the light radiation provided as output of the night vision device and propagating to the eye of the user by passing through the offsetting element 120.

The shutter 140 is configured to extend, in use, in front of the eye 11 of the user, on the side of the offsetting element 120 opposite the eye 111. The offsetting element 120 is then between the shutter 140 and the eye 11. The shutter does not necessarily have the same extent as the offsetting element 120. In particular, the shutter 140 here extends facing a portion only of the offsetting element, located in use across from the eye of the user. According to an alternative not shown, the shutter can extend laterally beyond the offsetting element, in particular for blocking as best as possible the light rays reflected on the eye of the user and/or on the skin of the user, in a zone of the face surrounding the eye.

Here, the vision apparatus is provided with a screen 180 at least partially transparent in the visible, of the eyeglass type, or mask screen, or headset visor. In use, the offsetting element 120 extends between the screen 180 and the eye of the user. Here, the shutter 140 is adjoining the screen 180, and extends along all or a portion of the surface of the latter. The shutter 140 extends here against the screen 180, on the same side of the screen as the offsetting element 120. According to an alternative not shown, the shutter 140 extends against the screen 180, on the side of the screen opposite the offsetting element 120. According to another alternative not shown, there is no screen separate from the offsetting element. The shutter 140 can then be adjoining against the offsetting element 120, on the side opposite the eye of the user. In any case, the shutter 140 can extend along a non-planar surface, for example to follow the curvature of the screen 180.

The shutter 140 is able to have two positions among an open position, wherein it has a first transmission rate, and a closed position, wherein it has a second transmission rate less than the first transmission rate. Preferably, the first transmission rate, or low rate, is less than 1%, in the visible, and the second transmission rate, or high rate, is greater than 30%, in the visible. In any case, the second transmission rate must be as high as possible, but a rate of about 30% will not disturb the user, simply giving the user the impression of seeing through glasses that are slightly tinted. To simplify, it is considered in what follows that in the closed position, the shutter blocks the light, and in the open position the shutter allows the light to pass.

The shutter 140 can be of the matrix type, formed for example from a liquid crystal screen. Alternatively, the shutter can be of the electro-chromic type, able to change colour and transmission rate in response to the application of an electric charge, by an oxidation-reduction phenomenon. The phenomenon is reversible. The shutter can resume its initial transmission rate automatically, after a predetermined interval of time, or in response to the application of a very low electrical charge. It can thus alternate rapidly between these two positions, while still having low energy consumption.

In the closed position thereof, the shutter 140 blocks the passage of the light, in both directions. Thus, the light coming from the surrounding scene does not reach the eye of the user, in such a way that the user does not directly see the surrounding scene. Furthermore, the shutter 140 prevents a light radiation transiting through the offsetting element 120 and/or reflected on the eye of the user and/or reflected on the skin of the user in a zone of the face near the eye, from being seen by an observer, in particular a light radiation coming from the night vision device 110. In this position, the user does not have a direct vision of the surrounding scene, but it is also hardly visible for an observer.

In the open position thereof, the shutter 140 authorises the passage of the light, in both directions. In this position, the light coming from the surrounding scene reaches the eye of the user who can thus directly observe said scene. Furthermore, a light radiation transiting through the offsetting element 120 and/or reflected on the eye of the user and/or reflected on the skin of the user in a zone of the face near the eye can be seen by an observer, in particular a light radiation coming from the night vision device 110. In this position, the user has a direct vision of the surrounding scene, but it is also more visible for an observer.

Advantageously, the shutter 140 is able to rapidly alternate between these two positions, according to cycles of a frequency for example greater than or equal to 50 Hz, even greater than or equal to 140 Hz (where the duration of a cycle corresponds to the duration between two successive changings to the open position). In any case, the shutter 140 is advantageously able to alternate between these two positions, in such a way that the user does not perceive these alternations and has a continuous vision of the surrounding scene, due to retinal persistence. The shutter 140 must also, as much as possible, have a mass that is compatible with the devices that can be worn on the head, have low energy consumption, be compatible with current conditions of use (temperature, pressure, impacts, etc.), and offer a high extinction rate.

The switching element 160 is disposed at the output of the night vision device 110, upstream from the offsetting element 120 in the direction of circulation of the light at the output of the night vision device 110.

The switching element 160 is able to have two positions among an open position wherein it authorises the emission of the first virtual images by the night vision device 110 or the transfer thereof from the night vision device 110 to the offsetting element 120, and a closed position wherein it blocks said emission or said transfer.

The switching element 160 is formed here by a liquid crystal screen, or a shutter of the electro-chromic type such as described hereinabove. It is configured to authorise or block, according to the case, the transfer of the virtual image from the night vision device 110 to the offsetting element 120. It is considered that the switching element 160 blocks or authorises the passage of the light, even when in practice the blocking can correspond simply to a first transmission rate and the authorisation to a second transmission rate that is higher than the first transmission rate.

According to an alternative not shown, the switching element 160 is configured to control the operation or the stopping of the emission of light by the night vision device 110. An image intensifier tube can for example be provided with such a switching element, allowing the tube to alternate between an operating position (emission of light) and a stopped position (no emission of light), according to cycles of a duration that can be less than 1 μs (wherein the duration of a cycle corresponds to the duration between two successive changings to the operating position). In the same way, a display screen of a night vision device can be provided with such a switching element, allowing the screen to alternate between an operating position (emission of light) and a stopped position (no emission of light).

In the open position thereof, the switching element 160 authorises the transfer of the first virtual images from the night vision device 110 to the offsetting element 120, or simply the emission thereof by the night vision device 110. In this position, the user sees the first virtual images which are projected in field of view of the user. The light radiation emitted by the night vision device 110 however forms parasite reflections within the offsetting element 120 and/or on the eye 11 of the user and/or on the skin of the user in a zone of the face near the eye.

In the closed position thereof, the switching element 160 blocks the transfer of the first virtual images from the night vision device 110 to the offsetting element 120, or simply the emission thereof by the night vision device 110. In this position, the user does not see any image coming from the night vision device. Since no radiation coming from the night vision device reaches the offsetting element, there is no parasite reflection linked to such radiation within the offsetting element 120 and/or on the eye 11 of the user and/or on the skin of the user in a zone of the face near the eye.

The controlling device 150 preferably comprises a central unit that has a processor implementing program recorded in a memory. It is configured to control the position of the switching element 160 together with the position of the shutter 140, in such a way that the shutter 140 is closed during all or a portion of a period during which the switching element 160 is open, and that the shutter 140 is open during all or a portion of a period during which the switching element 160 is closed.

When the switching element 160 is open, the vision apparatus according to the invention offers a view in night vision of the surrounding scene. When the shutter 140 is open, the vision apparatus according to the invention offers a direct vision of the surrounding scene, here in transparency through the offsetting element 120 at least. The vision apparatus according to the invention can thus offer both a view in transparency of the surrounding scene and a view in night vision of the same scene. However, in order to guarantee great discretion, these two views are not proposed simultaneously, as is the case in the augmented reality vision apparatuses of the prior art, but at least in part in alternation.

Figure 1C:
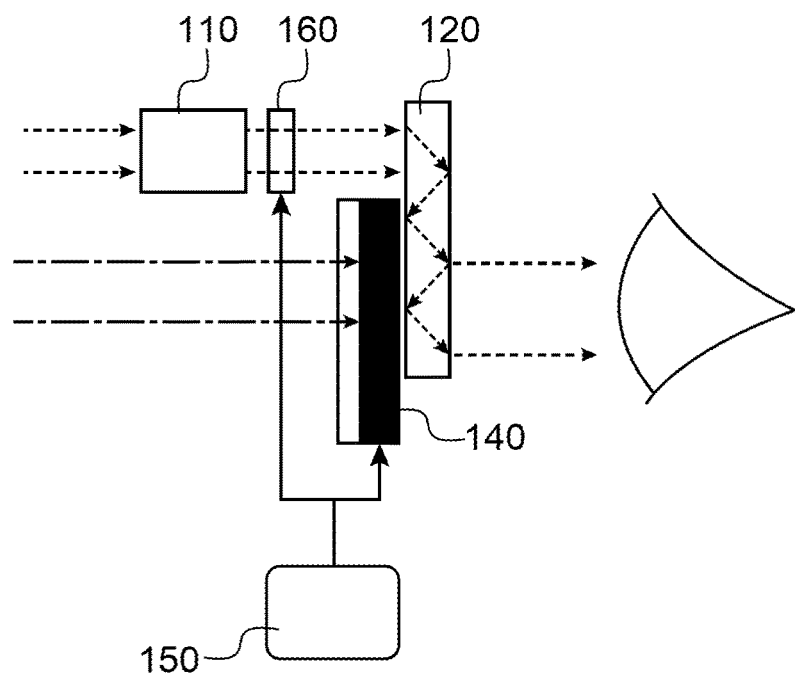
FIG. 1C diagrammatically shows the vision apparatus of FIG. 1B, in a first configuration.
Figure 1D:
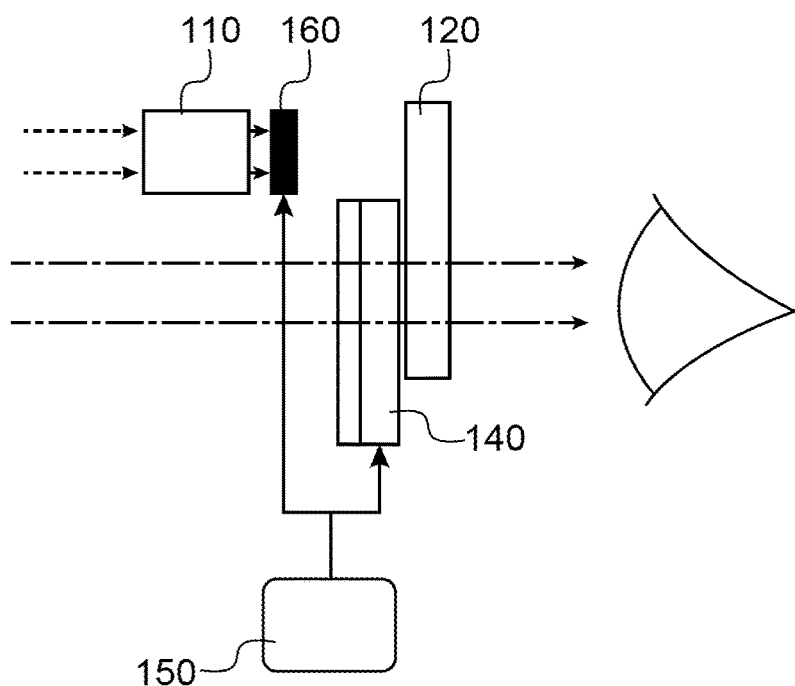
FIG. 1D diagrammatically shows the vision apparatus of FIG. 1B, in a second configuration.

The vision apparatus according to the invention can have in particular two configurations, shown respectively in FIGS. 1C and 1D.

In FIG. 1C, the switching element 160 authorises the transfer of the first virtual images from the night vision device 110 to the offsetting element 120, and the shutter 140 is closed. In this position, the user has a view in night vision of the surrounding scene (thanks to the first virtual images emitted by the night vision device 110 and projected in the field of view of the user), but does not have a direct view of the surrounding scene (due to the closed position of the shutter 140). Thanks to the closed position of the shutter 140, parasite reflections formed by the light radiation emitted by the night vision device 110, are prevented from being seen by an observer.

In FIG. 1D, the switching element 160 is closed, in such a way as to prevent the transfer of the first virtual images from the night vision device 110 to the offsetting element 120, and the shutter 140 is open. In this position, the user has a direct view of the surrounding scene. In this position, the user does not have a view in night vision of the surrounding scene since the first virtual images are not projected in the field of view of the user. In this case, the formation of parasite reflections that can be seen by an observer is prevented by blocking, at the switching element 160, the light radiation emitted by the night vision device 110.

The controlling device 150 is configured to open and close the shutter 140 according to first successive cycles each including a period of time during which the shutter 140 is open and a period of time during which the shutter is closed. By neglecting the switching times, each cycle is formed by each one of these two periods. At each cycle, the shutter 140 will successively prevent and authorise a direct vision of the surrounding scene. Preferably, each cycle lasts less than 50 ms, more preferably less than 5 ms, for example about 1 ms. Due to retinal persistence, the user will thus have continuously a direct vision of the surrounding scene. This vision of the surrounding scene is a so-called natural vision, without any reduction in the field of view of the user. The duration of the first cycles defines an opening and closing frequency of the shutter. A first duty cycle can be defined, equal for each first cycle to the duration during which the shutter 140 is in the open position divided by the total duration of this first cycle. Advantageously, this first duty cycle is variable over time. The value of the first duty cycle is then controlled by the controlling device 150, for example according to an instruction received via a man-machine interface, or according to an instruction defined using a brightness measurement (or light level measurement). (In the whole text, the term "brightness" refers to a light level.)

Likewise, the controlling device 150 is configured to open and close the switching element 160 according to second successive cycles each including a period of time during which the switching element 160 is open and a period of time during which the switching element 160 is closed. By neglecting switching times, each cycle is formed by each one of these two periods. At each cycle, the switching element 160 will successively prevent and authorise a view in night vision of the surrounding scene. Preferably, each cycle lasts less than 50 ms, more preferably less than 5 ms, for example about 1 ms. Due to retinal persistence, the user will thus have continuously a view in night vision of the surrounding scene. This view in night vision of the surrounding scene is a so-called natural vision, without any reduction in the field of view of the user. The duration of the second cycles defines an opening and closing frequency of the switching element. A second duty cycle can be defined, equal for each second cycle to the duration during which the switching element is in the open position divided by the total duration of this second cycle. Advantageously, this second duty cycle is variable over time. The value of the second duty cycle is then controlled by the controlling device 150, for example according to an instruction received via a man-machine interface, or according to an instruction defined using a brightness measurement (or light level measurement).

Furthermore, at each first cycle and each second cycle, the shutter 140 is closed during all or a portion of the period of time during which the switching element 160 is open, and the shutter 140 is open during all or a portion of the period of time during which the switching element 160 is closed. In other words, the controlling device 150 is configured to control together the switching element 160 and the shutter 140, according to successive cycles that each include a period during which the vision apparatus has the configuration of FIG. 1C, and a period during which the vision apparatus has the configuration of FIG. 1D.

Preferably, the frequency of the first and second cycles is sufficiently high to offer the user a feeling of continuous and simultaneous vision of the view in night vision and of the view in direct vision of the surrounding scene. The user can thus benefit from a natural vision in colour of a surrounding scene, despite an ambient light level that would not normally allow for this, and together with a great discretion of use.

Preferably, the first and second cycles are in total phase opposition. In other terms, and by neglecting switching times, at each first cycle and each second cycle, the shutter 140 is closed during the entire period during which the switching element 160 is open, and the shutter 140 is open during the entire period during which the switching element 160 is closed. The first virtual images are therefore projected discontinuously by the offsetting element, only when the shutter 140 is in the closed position and during the entire duration during which the shutter 140 is in the closed position. This allows for maximum discretion of the vision apparatus according to the invention. Such an operating mode is particularly advantageous in low light conditions (in other words in low brightness conditions).

In the rest of the figures, and for reasons of clarity, the screen of the eyeglass, mask screen or headset visor type is not shown.

Figure 2:
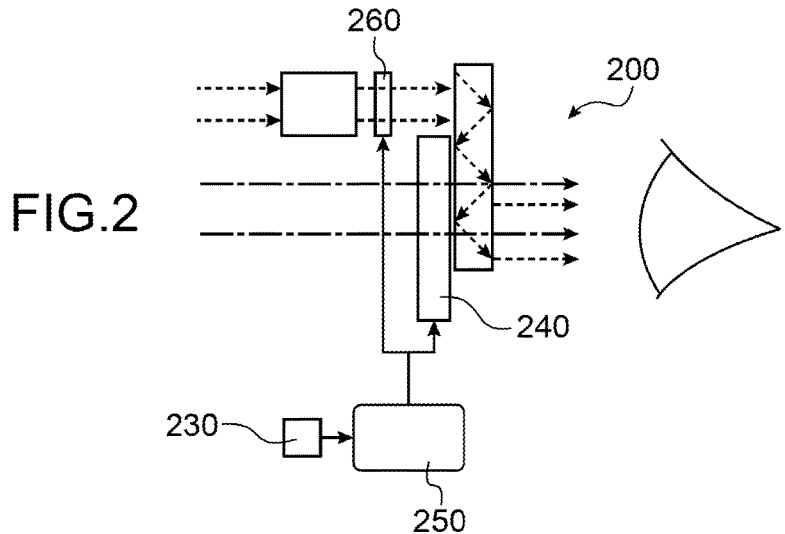
FIG. 2 diagrammatically shows a second embodiment of a vision apparatus according to the invention.

FIG. 2 shows a second embodiment of a vision apparatus 200 according to the invention, that differs from the device of FIGS. 1B to 1D only in that it further includes a brightness measuring element 230, or light level measuring element 230.

The brightness measuring element 230 makes it possible to take a measurement relative to the ambient brightness (or ambient light level) of the surrounding scene, in the visible spectrum. It is configured to acquire for example a light intensity measurement, or an illuminance measurement. It can be formed by a simple photodiode sensitive in the visible, or be formed by the night vision device itself (see FIG. 3).

The brightness measuring element 230 is connected to the controlling device 250, in order to provide it with an ambient brightness measurement (or light level measurement).

The controlling device 250 is configured to receive as input said ambient brightness measurement, in order to determine in response a controlling instruction that depends on said brightness measurement, and to control the opening or the closing of the shutter 240 and of the switching element 260 using said controlling instruction.

Advantageously, the controlling device 250 is able to control first cycles of opening and closing the shutter 240 and second cycles of opening and closing the switching element 260 such as described hereinabove, and in such a way that each first cycle has a duty cycle that increases when the value of the brightness measurement increases, said duty cycle being equal to the duration during which the shutter 240 is in the open position during this cycle divided by the total duration of said cycle.

Such a controlling of the shutter 240 makes it possible to block as much of the light coming from the surrounding scene as the ambient brightness (or ambient light) is strong. It is thus possible to equalise an average quantity of light reaching the user directly coming from the surrounding scene, and an average quantity of light reaching the user coming from the night vision device. An optimum rendering of the view as night vision as well as the view in direct vision is thus guaranteed. This controlling also makes it possible to block as much the parasite reflections linked to the light coming from the night vision device 210, as the ambient brightness is low. A great discretion of the vision apparatus 200 is thus guaranteed, since the visibility of these parasite reflections depends on the light contrast of the latter with the surrounding scene.

Preferably, the first and second cycles are in total phase opposition. Thus, the higher the ambient brightness is, the more the direct vision of the surrounding scene is favoured, and the lower the ambient brightness is, the more the night vision of the surrounding scene is favoured. The two extreme situations correspond to duty cycles of 0 or 1 (shutter 240 continuously closed and switching element 260 continuously open, or inversely).

Figure 3:
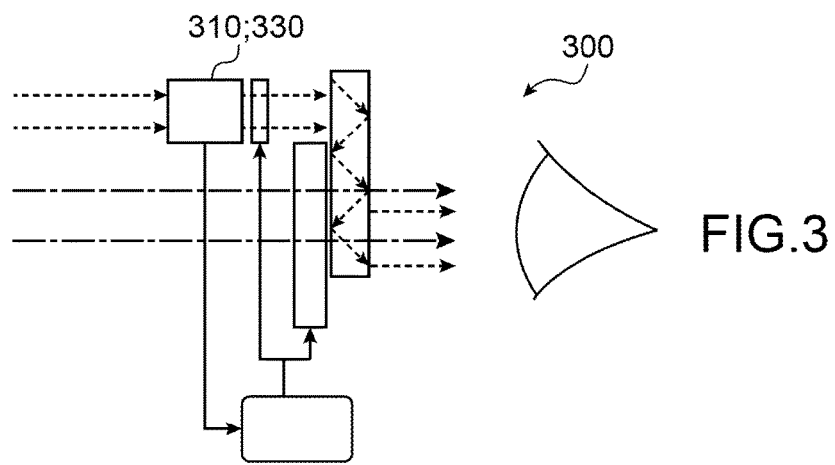
FIG. 3 diagrammatically shows a third embodiment of a vision apparatus according to the invention.

FIG. 3 diagrammatically shows a third embodiment of a vision apparatus 300 according to the invention, which differs from the embodiment shown in FIG. 2 only in that the night vision device 310 also forms the brightness measuring element 330. In this case, the night vision device 310 can include a module for calculating an average brightness over the entire surrounding scene, using measurements provided by each one of the pixels of the night vision device 310.

Alternatively, only a portion of a detection surface of the night vision device 310 is used to form the brightness measuring element 330.

Figure 4:
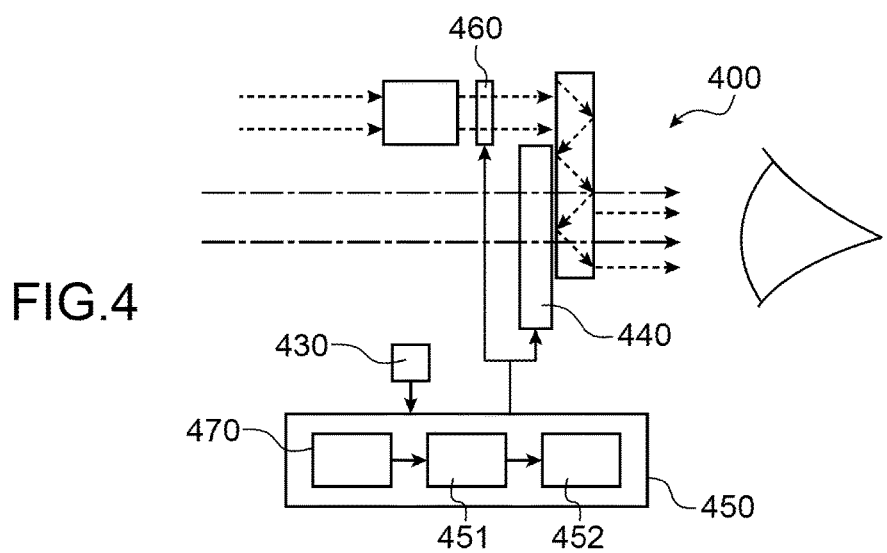
FIG. 4 diagrammatically shows a fourth embodiment of a vision apparatus according to the invention.

FIG. 4 diagrammatically shows a fourth embodiment of a vision apparatus 400 according to the invention, which differs from the embodiment shown in FIG. 2 only in that the controlling device 450 further includes a memory 470, storing one or more brightness threshold values (or light level threshold value). These one or more threshold values define together at least two intervals of brightness values.

The controlling device 450 also includes a comparator 451, connected as input to the memory 470 and to the brightness measuring element 430, and a processing module 452, connected to the output of the comparator 451.

The comparator 451 is configured to compare a brightness measurement provided by the brightness measuring element 430 with one or more threshold values stored in the memory 470, and to deduce therefrom an interval of brightness values to which the brightness measurement belongs. This interval is provided to the processing module 452.

The processing module 452 is configured to associate each interval with a predetermined operating mode of the vision apparatus, and to then generate a controlling command according to said operating mode. Said controlling command is provided to the shutter 440 and to the switching element 460.

It is possible to define for example the three operating modes hereinbelow:
- When the ambient brightness is high, greater than a first predetermined threshold, the shutter 240 is continuously in the open position and the switching element 260 continuously in the closed position;
- When the ambient brightness is low, less than a second predetermined threshold which itself is less than the first threshold, the shutter 240 is continuously in the closed position and the switching element 260 continuously in the open position;
- When the ambient brightness is comprised between these two thresholds, the shutter 240 and the switching element 260 are each alternatively in the open and closed position, according to successive cycles such as described hereinabove, in total or partial phase opposition.

Thus, when the ambient brightness does not justify using the night vision, only the direct vision of the scene is offered to the user. Inversely, when the ambient brightness is very low, only the night vision of the scene is offered to the user. Between the two, the two visions are combined as described hereinabove.

Figure 5A:
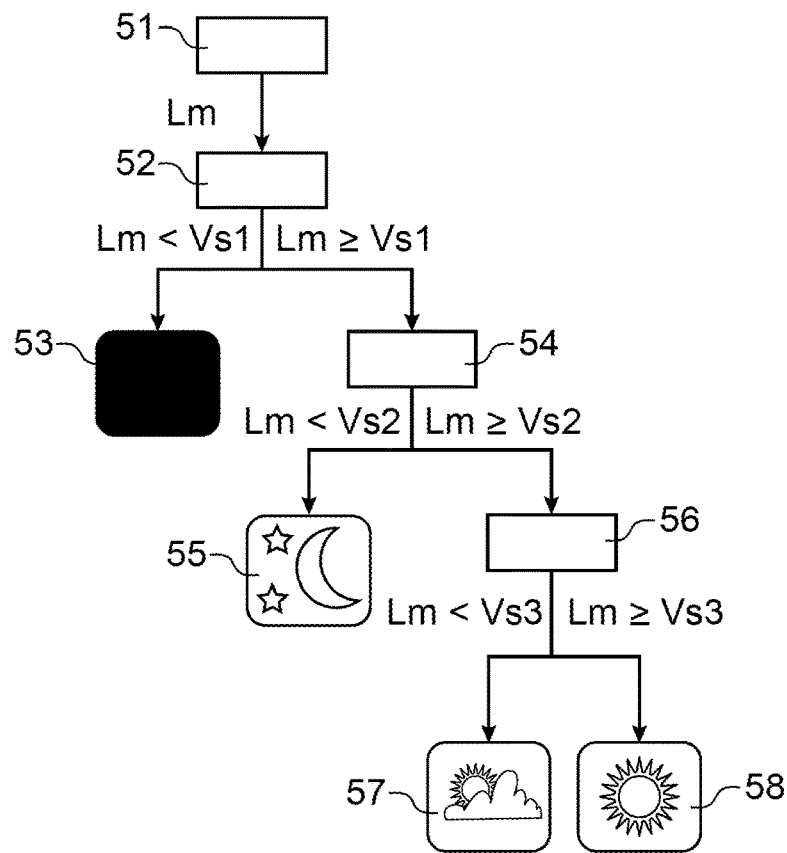
FIG. 5A diagrammatically shows a method implemented in a vision apparatus according to the invention.
Figure 5B:
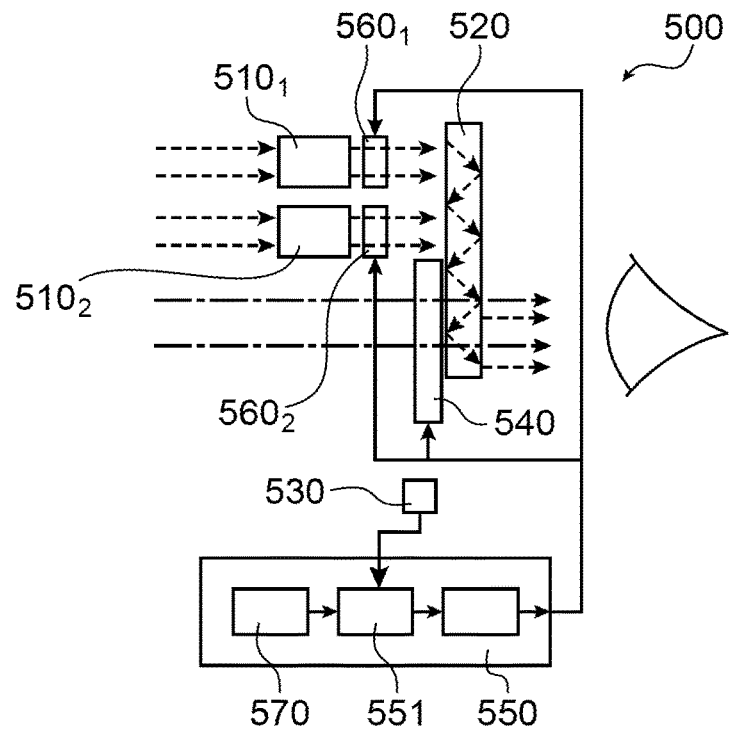
FIG. 5B diagrammatically shows a fifth embodiment of a vision apparatus according to the invention.

In reference to FIGS. 5A and 5B, a fifth embodiment of a vision apparatus 500 according to the invention is described, and a particularly complete example of the method implemented in this vision apparatus.

The vision apparatus 500 includes a night vision device $510_1$ such as described hereinabove, and an augmented reality vision device $510_2$.

The augmented reality vision device $510_2$ is for example connected to supplementary sensors, not shown, and configured to generate and emit second virtual images including visual indicators that are representative of the measurements provided by these supplementary sensors. These can be indicators of position, altitude, speed, direction, etc. Such a device can also include at least one camera, connected to a means of image processing to identify objects of interest on images acquired by the at least one camera and generate as a response second virtual images wherein these objects of interest are revealed. The at least one camera can comprise a thermal camera, a night vision camera, and/or a camera sensitive in the visible, etc. The device can include two cameras, for example a thermal camera and a camera sensitive in the visible, and a processing module to merge the images acquired by each one of these two cameras.

The offsetting element 520 is furthermore able to project the second virtual images, in the field of view of the user.

Two switching elements $560_1$, $560_2$ are disposed respectively at the output of the night vision device $510_1$ and at the output of the augmented reality vision device $510_2$. Each one of these switching elements is such as described hereinabove. In particular, each one of these switching elements $560_1$, $560_2$ can be formed by a hardware element of the liquid crystal screen type, or by a signal processing module configured to directly control emission instants of a virtual image by the night vision device $510_1$, respectively the augmented reality vision device $510_2$.

The controlling device 550 is similar to the one of FIG. 4, except that it also controls the opening and the closing of the switching element $560_2$, associated with the augmented reality vision device $510_2$.

The memory 570 here stores three brightness threshold values Vs1, Vs2, Vs3, where Vs1 is strictly less than Vs2 and Vs2 is strictly less than Vs3. These three values together define four intervals of brightness values:
- an interval of ultra low brightness values, wherein the brightness is comprised between the zero value and Vs1 (Vs1 excluded),
- a interval of low brightness values, wherein the brightness is comprised between Vs1 and Vs2 (Vs2 excluded),
- an interval of high brightness values, wherein the brightness is comprised between Vs2 and Vs3 (Vs3 excluded), and
- an interval of very high brightness values, wherein the brightness is greater than or equal to Vs3.

There is for example:
Vs1=700 µlux, the interval of ultra low brightness values then corresponding to night level 5; and
Vs2=15 mlux, the interval of low brightness values then corresponding to night levels 3 and 4.

In a first step 51, the brightness measuring element 530 acquires an ambient brightness measurement, and sends this measurement Lm to the comparator 551 of the controlling device.

In step 52, the comparator 551 compare the measurement Lm with the smallest threshold value Vs1.

If Lm is strictly less than Vs1, the comparator deduces therefrom that the value Lm is located in the interval of ultra low brightness values. In the associated operating mode, the controlling device 550 controls the shutter 540 and the switching elements $560_1$, $560_2$ in such a way as to maintain the shutter 540 constantly in the closed position and the switching elements $560_1$, $560_2$ constantly in the open position (step 53). A great discretion of the vision apparatus according to the invention is thus provided. The absence of direct vision of the surrounding scene is not detrimental, since this scene is not illuminated well enough to offer the user a satisfactory direct vision. Where applicable, it is possible to adapt the contrast and/or brightness parameters at the output of each one of the imaging devices $510_1$, $510_2$, in order to offer the user the best visual comfort. Alternatively, the switching element $560_2$ at the output of the augmented reality vision device $510_2$ can be maintained in the closed position.

If Lm is greater than or equal to Vs1, the comparator compares, in a step 54, the brightness value Lm with the threshold value Vs2.

If Lm is strictly less than Vs2, the comparator deduces therefrom that the value Lm is located in the interval of low brightness values. In the associated operating mode, the controlling device 550 controls the shutter 540 and the switching element 560₁, according to successive cycles of opening and closing such as described hereinabove, preferably in total phase opposition. Preferably, the controlling device 550 controls the switching element 560₂ in the same way as the switching element 560₁. As explained hereinabove, a great discretion of the vision apparatus according to the invention is thus assured while still offering the user a direct vision of the surrounding scene, in addition to the vision of the virtual images.

If Lm is greater than or equal to Vs2, the comparator compares, in a step 56, the brightness value Lm with the threshold value Vs3.

If Lm is strictly less than Vs3, the comparator deduces therefrom that the value Lm is located in the interval of high brightness values. In the associated operating mode, the controlling device 550 controls the shutter 540 in such a way as to maintain it constantly in the open position (step 57). Preferably, it controls the switching element 560₁ associated with the night vision device, in such a way as to maintain it constantly in the closed position. Indeed, in these conditions of brightness, the night vision is of no interest for the user. Preferably, it controls the switching element 560₂ associated with the augmented reality vision device, in such a way as to maintain it constantly in the open position. A direct vision of the surrounding scene is thus offered, enriched by information coming from supplementary sensors, according to the principle of augmented reality vision. Where applicable, it is possible to adapt the contrast and/or light intensity parameters of the virtual image provided by the augmented reality vision device, in order offer the user the best visual comfort.

If Lm is greater than or equal to Vs3, the comparator deduces therefrom that the value Lm is located in the interval of very high brightness values. In the associated operating mode, the controlling device 550 controls the opening and the closing of the shutter 540 according to successive cycles of opening and closing, in order to limit a blinding of the user by the ambient light (step 58). Preferably, it controls the switching element 560₁ associated with the night vision device, in such a way as to maintain it constantly in the closed position. Indeed, in these conditions of brightness, the night vision is of no interest for the user. Preferably, it controls the switching element 560₂ associated with the augmented reality vision device, in such a way as to maintain it constantly in the open position, or according to successive cycles of opening and closing allowing the switching element 560₂ to be in the open position during at least one portion of a time interval during which the shutter 540 is in the closed position. The visibility of the virtual image projected to the user is thus improved, by reducing the quantity of light that reaches the eye of the user when the virtual image is projected in the field of view of the user.

Advantageously, the controlling device 550 can switch to the operating mode associated with the interval of ultra low brightness values, when the charge of a battery of the vision apparatus 500 passes below a predetermined threshold. The energy consumption of the vision apparatus 500 is thus limited to the maximum.

Many alternatives of this method can be implemented, according to whether the vision apparatus includes or does not include an augmented reality vision device, with or without an associated switching element.

According to yet other alternatives, the method does not include all the operating modes described hereinabove.

The invention is not limited to the examples described hereinabove, and many alternatives of vision apparatuses and of associated methods can be implemented without leaving the scope of the invention.

For example, in each one of the examples shown, the night vision device and the shutter are on the same side of the offsetting element, on the side opposite the eye, in use. Alternatively, the offsetting element can be partially reflective, with the offsetting element disposed between the night vision device and the shutter.

According to yet other alternatives, the vision apparatus according to the invention does not include a screen of the eyeglass, mask screen or headset visor type.

In each one of the embodiments wherein the controlling device is connected to a brightness measuring element, the controlling device can be provided with a switch, to switch from an automatic control according to a brightness measurement provided by the brightness measuring element, to a manual control according to an instruction provided by a user via a man-machine interface. According to yet other alternatives, the controlling device is not connected to a brightness measuring element, and includes a man-machine interface for a manual control only, in particular a controlling of duty cycle variation associated with opening and closing cycles of the shutter and/or with opening and closing cycles of the switching element.

The vision apparatus can include one or two assemblies, each including a night vision device, an offsetting element, a shutter, and a switching element, and each allocated to one of the two eyes of the user. Respective opening and closing cycles of the shutter and of the switching element can be offset in time, for each one of the two assemblies. This makes it possible to reduce the movement artefacts or other inconveniences that can negatively affect the comfort of the user. Where applicable, the shutters each associated with one of the two eyes can be formed together from a single piece. Likewise, the switching elements each associated with one of the two eyes can be formed together as a single piece. According to yet other alternatives, a single assembly comprising a night vision device, an offsetting element, a shutter, and a switching element, can be assigned to the two eyes of the user.

It is possible to adapt a light intensity at the output of the night vision device according to the invention according to a duty cycle of the corresponding switching element, in order to compensate for a loss of brightness linked to the partial extinction of the output of the night vision device. It is also possible to adapt a light intensity at the output of the night vision device according to an ambient brightness, in order to improve the visibility of the virtual images projected to the user. It is in particular possible to adjust a gain of an intensifier tube, or the brightness of a display screen.

Where applicable, the shutter can be spatially segmented into several zones, in order to locally block the light according to a spatial distribution of the brightness provided for example by the night vision device. It is thus possible to filter uncomfortable or tiring intense sources of light from the environment, that are present in the field of view and that can interfere with the virtual images.

When the vision apparatus according to the invention includes both a night vision device and an augmented reality vision device, associated with the same eye of the user, these two devices are advantageously associated with the same offsetting element. Yet it is possible to have a respective offsetting element for each one of them. A respective switching element can be assigned to each one of these two devices. Alternatively, the same switching element is associated with these two devices. Preferably, the same shutter is assigned to each one of the two devices.

What is claimed is:

1. Vision apparatus intended to be mounted on the head of a user, comprising:
   a night vision device, configured to form intensified and/or infrared images of a surrounding scene, named first virtual images; and
   an offsetting element, at least partially transparent, and configured to, in use, be positioned in front of an eye of the user and project said first virtual images in the field of view of the user;
   a shutter to allow more or less light to pass between the surrounding scene and the eye of the user, positioned in such a way that in use the offsetting element is between the shutter and the eye of the user, and able to have an open position wherein it has a first transmission rate and a closed position wherein it has a second transmission rate, less than the first transmission rate;
   a switching element, able to have an open position wherein it authorises the emission of the first virtual images by the night vision device or the transfer thereof from the night vision device to the offsetting element, and a closed position wherein it blocks said emission or said transfer; and
   a controlling device, configured to control the opening and the closing of the shutter as well as the opening and the closing of the switching element;
   wherein that the controlling device has an operating mode wherein it is configured to:
   control first successive cycles of opening and of closing the shutter; and
   control second successive cycles of opening and of closing of the switching element;
   where at each first cycle and each second cycle, the shutter is closed during all or a portion of the time during which the switching element is open, and inversely.

2. Vision apparatus according to claim 1, wherein the controlling device has an operating mode wherein it is configured to control the opening and the closing of the shutter as well as the opening and the closing of the switching element in such a way that at each first cycle and each second cycle the shutter is closed during the entire time when the switching element is open, and inversely.

3. Vision apparatus according to claim 1, further comprising a brightness measuring element, for acquiring a brightness measurement in an external environment of the vision apparatus, and in that the controlling device has an operating mode wherein it is configured to receive as input a brightness measurement acquired by the brightness measuring element, and to control the opening and the closing of the shutter as well as the opening and the closing of the switching element according to said brightness measurement.

4. Vision apparatus according to claim 3, wherein the controlling device has an operating mode wherein the controlling device is configured to:
   control first successive cycles of opening and of closing the shutter; and
   control second successive cycles of opening and of closing of the switching element;
   where at each first cycle and each second cycle, the shutter is closed during all or a portion of the period of time during which the switching element is open, and inversely;
   and wherein each first cycle has a duty cycle that increases when the value of the brightness measurement increases, said duty cycle being equal to the duration during which the shutter is in the open position during this cycle divided by the total duration of said cycle.

5. Vision apparatus according to claim 3, wherein the controlling device further comprises:
   a memory, storing a plurality of threshold values; and
   a comparator, configured to compare the brightness measurement with at least one among said threshold values;
   and in that the controlling device is configured to operate according to one among a plurality of predetermined operating modes, according to at least one comparison result provided by the comparator, with the operating modes that differ by corresponding rules for controlling the shutter and the switching element.

6. Vision apparatus according to claim 3, wherein the brightness measuring element comprises a light sensor separate from the night vision device.

7. Vision apparatus according to claim 3, wherein the brightness measuring element is formed by a portion at least of the night vision device.

8. Vision apparatus according to claim 1, further comprises further comprising an augmented reality vision device configured to generate images named second virtual images, and in that the offsetting element is configured to further project said second virtual images in the field of view of the user.

9. Method implemented in a vision apparatus according to claim 1, the method comprising the following steps:
   openings and closings of the shutter, controlled by the controlling device, and according to first successive cycles of opening and of closing of the shutter; and
   openings and closings of the switching element, controlled by the controlling device, and according to second successive cycles of opening and of closing of the switching element;
   where at each first cycle and each second cycle, the shutter is closed during all or a portion of the time during which the switching element is open, and inversely.

10. Method according to claim 9, wherein said steps of openings and closings of the shutter, and of opening and closings of the switching element, are implemented in such a way that the shutter is in the closed position during the entire time when the switching element is in the open position, and inversely.

11. Method according to claim 9, wherein the method is implemented in a vision apparatus that further includes a brightness measuring element, the method further comprising the following steps:
    acquiring, by the brightness measuring element, of a brightness measurement in an external environment of the vision apparatus;
    receiving of said brightness measurement by the controlling device; and
    opening or closing of the shutter, and opening or closing of the switching element, controlled by the controlling device according to said brightness measurement.

12. Method according to claim 11, further comprising the following steps:
    openings and closings of the shutter, controlled by the controlling device, and according to first successive cycles of opening and of closing of the shutter; and
    openings and closings of the switching element, controlled by the controlling device, and according to second successive cycles of opening and of closing of the switching element;

where at each first cycle and each second cycle, the shutter is closed during all or a portion of the time during which the switching element is open, and inversely;

and wherein each first cycle has a duty cycle that increases when the value of the brightness measurement increases, said duty cycle being equal to the duration during which the shutter is in the open position during this cycle divided by the total duration of said cycle.

13. Method according to claim 11, further comprising the following steps:

- comparing the brightness measurement (Lm) acquired by the brightness measuring element with a so-called ultra low threshold value (Vs1);
- when said brightness measurement (Lm) is less than the ultra low threshold value (Vs1), maintaining the shutter in the closed position and maintaining the switching element in the open position, controlled by the controlling device.

* * * * *